United States Patent
Born et al.

(10) Patent No.: US 6,548,004 B2
(45) Date of Patent: *Apr. 15, 2003

(54) PROCESS FOR MANUFACTURING INDIVIDUAL PIPE SECTIONS OF A PIPE SYSTEM, AND PIPE SYSTEM MANUFACTURED IN SAID MANNER

(76) Inventors: Werner Born, Wilhelm-Busch-Str. 90, Dormager (DE), 41541; Karl-Wilhelm Thomas, Ernsweg 7, Dormagen (DE), 41541

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,453
(22) PCT Filed: May 7, 1997
(86) PCT No.: PCT/EP97/02312
§ 371 (c)(1), (2), (4) Date: Nov. 6, 1998
(87) PCT Pub. No.: WO97/43576
PCT Pub. Date: Nov. 20, 1997

(65) Prior Publication Data
US 2001/0050110 A1 Dec. 13, 2001

(30) Foreign Application Priority Data
May 9, 1996 (DE) .......................... 196 18 370

(51) Int. Cl.⁷ .......................... B29C 44/06; B29C 44/12
(52) U.S. Cl. .................. 264/261; 264/46.9; 264/267
(58) Field of Search ................ 138/111, 113, 138/115; 264/46.9, 261, 267

(56) References Cited

U.S. PATENT DOCUMENTS

| | | | | |
|---|---|---|---|---|
| 1,519,694 A | * | 12/1924 | Muessman ................. | 138/115 |
| 3,151,633 A | * | 10/1964 | Shuman ...................... | 138/111 |
| 3,407,835 A | | 10/1968 | Rolfes | |
| 3,740,801 A | * | 6/1973 | Sears, Jr. et al. ........... | 138/111 |
| 3,754,064 A | * | 8/1973 | Snelling et al. ............ | 264/46.9 |
| 3,756,268 A | * | 9/1973 | Lefever et al. ............. | 137/340 |
| 3,782,452 A | * | 1/1974 | Ceplon ........................ | 138/112 |
| 3,793,411 A | * | 2/1974 | Stonitsch et al. .......... | 264/46.9 |
| 3,844,345 A | * | 10/1974 | Evans et al. ................ | 138/111 |
| 3,935,632 A | * | 2/1976 | Maxson ..................... | 264/46.9 |
| 4,064,355 A | * | 12/1977 | Neroni et al. .............. | 138/115 |
| 4,262,703 A | * | 4/1981 | Moore et al. ............... | 138/111 |
| 4,288,654 A | * | 9/1981 | Blom et al. .................. | 174/47 |
| 4,368,348 A | * | 1/1983 | Eichelberger et al. ...... | 138/111 |
| 4,384,905 A | * | 5/1983 | Gros .......................... | 156/79 |
| 4,496,823 A | * | 1/1985 | Mann ........................ | 138/115 |
| 5,390,961 A | * | 2/1995 | Guthrie ....................... | 285/41 |
| 5,678,609 A | * | 10/1997 | Washburn .................. | 138/111 |
| 5,791,380 A | * | 8/1998 | Onan et al. ................. | 264/269 |
| 6,213,157 B1 | * | 4/2001 | Thiebaud et al. .......... | 138/112 |

FOREIGN PATENT DOCUMENTS

| | | | |
|---|---|---|---|
| CH | 429327 | 7/1967 | |
| DE | 40 39 863 | 2/1992 | |
| DE | 41 24 640 | 1/1993 | |
| DE | 43 14 761 | 8/1994 | |
| FR | 2479945 | 10/1981 | |
| GB | 344882 | 12/1929 | |
| GB | 1083185 | 9/1967 | |
| WO | WO 93/00547 | * 1/1993 | ................. 138/111 |

* cited by examiner

Primary Examiner—Allan R. Kuhns
(74) Attorney, Agent, or Firm—Kean, Miller, Hawthorne, D'Armond, McCowan & Jarman

(57) ABSTRACT

The invention concerns a method for the manufacture of individual pipe sections of a pipe formed by a product pipe having at least one channel running along the product pipe. Surrounding the product pipe and the channel is a pipe jacket filled with an insulating mass which exhibits a flowability only in the processing condition. The channel running along the product pipe is formed by the outline of a core of material in place during addition of the insulation.

14 Claims, 2 Drawing Sheets

PROCESS FOR MANUFACTURING INDIVIDUAL PIPE SECTIONS OF A PIPE SYSTEM, AND PIPE SYSTEM MANUFACTURED IN SAID MANNER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a method for the manufacture of individual pipe sections of a pipe formed by a product pipe and of at least one channel running along the product pipe, particularly a heat channel in which the product pipe and the channel are fitted with an insulation enclosed with a jacket pipe and a pipe manufactured in that manner.

2. Description of Related Art

Practical applications often require pipes to be heated because the products to be transported within the product pipe exhibit appropriate flowability only at a certain temperature. The heating of the pipes is generally achieved with an accompanying heating system consisting of a heat pipe attached to the product pipe used to transport the product. German Patent No. DE-PS 43 14 761, for example, describes a method for the manufacture of individual pipe sections of a pig pipe. The patent describes a method in which the product pipe is fitted with an additional heating pipe through which the heating of the product to be transported in the product pipe is achieved with steam piped at a high pressure as the heating medium.

Practical applications have shown, however, that the heat transfer between the heating and product pipe is in many cases insufficient due to the linear contact area between the two pipes and due to the fact that steam cannot be used as the heating medium when the product to be transported in the product pipe should not come into contact with water for safety reasons. Furthermore, the known form for the heating channels is disadvantageous for pipes that are not straight, because the fitting of an additional heating pipe to the product pipe is difficult to achieve from a manufacturing point of view, particularly at sharp bends.

OBJECTS OF THE INVENTION

It is an object of the invention to provide a method for the manufacture of individual pipe sections of a pipe such that good heat transfer to the product pipe is achieved and any channel shape can be run along the product pipe in a cost-effective manner.

SUMMARY OF THE INVENTION

The invention is a method for the manufacture of individual pipe sections including a product pipe having a jacket surface and at least one channel running along the jacket surface of the product pipe including the following steps:

a) Arranging a core that exhibits at least the outside contour of the desired channel on the surface of the product pipe such that the channel to be formed upon the removal of the core will be immediately adjacent to the surface of the product pipe and approximately parallel to the product pipe.

b) Inserting the product pipe with the core into a jacket pipe; and c) Filling the jacket pipe with an insulating mass that exhibits a flowability only during processing.

An advantage of the invention is that any channel type may be manufactured along the product pipe such that it is in direct contact with the surface of the product pipe.

Accordingly, it is a feature of the invention to easily pull an electric heat conductor through the channel arranged in the manner of the invention. It is also possible to run heating gas through the channel. In addition to utilizing the channel as a heating channel, it is also possible to use it for receiving a detector cable or a so-called "sniffing pipe" which can detect leaks in the product pipe.

These and other objects, advantages, and features of this invention will be apparent from the following description.

DETAILED DESCRIPTION OF THE INVENTION

Figure 1:
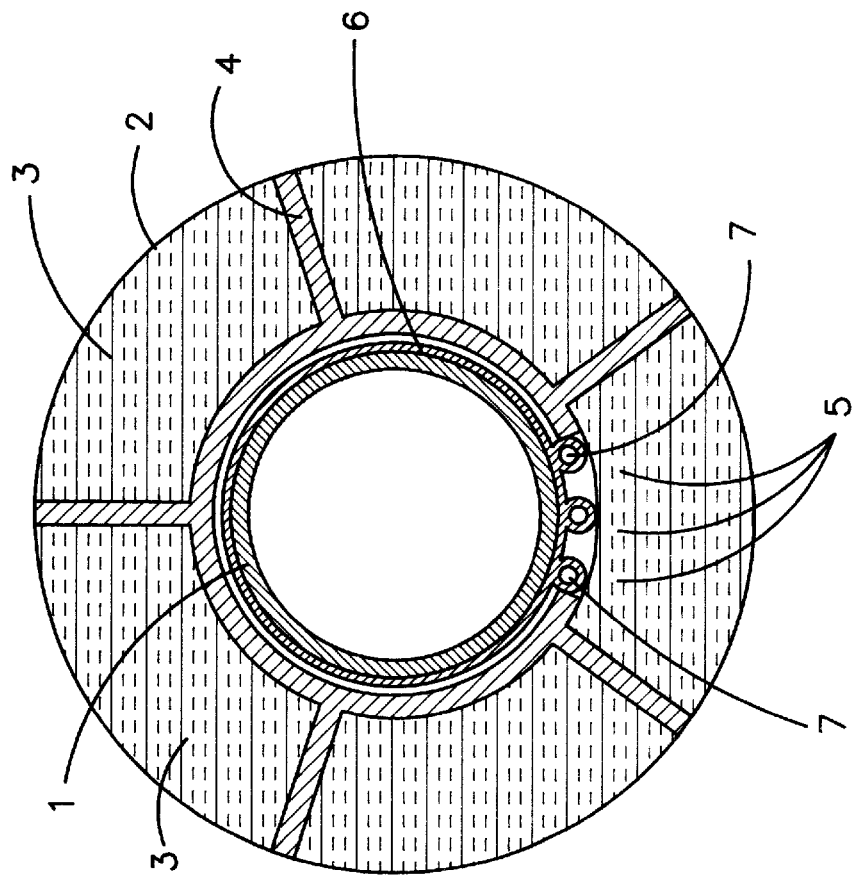
FIG. 1 is a cross-section of a preferred embodiment of the invention in a rectangular channel configuration.

It was proven particularly advantageous to manufacture the channel by pulling the core out of the jacket pipe after the insulation mass has hardened. In addition to yielding a simple channel manufacture, said method also allows a reuse of the core retrieved in that manner. It also allows the use of a solid core, as opposed to one that merely exhibits the outside contour of the channel, which adds to its durability and reusability. Pulling the core out of the hardened insulation mass produces a channel that runs along the surface of a product pipe and that is in direct contact with the surface of the product pipe, thus ensuring a good heat transfer between heating channel and product pipe.

According to a preferred embodiment of the invention, the material used for the core consists of an elastic material whose cross-section decreases in area with the application of a tensile force. Silicone rubber is such a material, for example. After the insulation mass has hardened, an elastic material is particularly easy to pull out of the pipe section. When applying a tensile force, the outer surface of this elastic core material separates from the hardened insulation mass due to the decreased cross-section and pulling the core out of the channel formed by it requires very little effort.

A further embodiment of the invention proposes that the core material consists of a material that is elastic and expands under pressure. For example, such a core can be formed with a hose that maintains its shape by way of a hydraulic or pneumatic pressure until the insulation mass has hardened. The hose will collapse after lowering the pressure and can be pulled out of the jacket pipe.

A further embodiment of the invention proposes that the core consists of a non-elastic material, to which is applied a separating agent on the outside surface facing the insulation mass and prior to pushing the product pipe and core into the jacket pipe. A core made of a non-elastic material can only be used for generally straight pipe sections, since pulling the core out of the hardened insulation mass would otherwise require much effort. In that respect, the separating agent applied to the outside core surface should reduce the frictional forces between the hardened insulation mass and core. Applying a separating agent has also proven beneficial for a core made of an elastic material.

According to an alternative embodiment of the invention, the channel that is open toward the product line is produced using a hollow profile core of generally "U" shaped cross section that is arranged on the product pipe with its open side facing the product pipe and remains in the jacket pipe after the insulation mass has hardened.

To improve the heat transfer between channel and product pipe and to make the pulling-out of the core from the hardened insulation mass easier, a further embodiment of the invention proposes that a thin coating that preferably promotes the heat transfer be applied to the core surface facing the insulation mass as well as to the portion of the surface of the product pipe touching the core prior to inserting the product pipe with core into the jacket pipe.

According to a preferred embodiment of the invention, this thin coating that preferably promotes the heat transfer is applied to the core surface facing the insulation mass as well as to the entire surface of the product pipe. In this manner, it is possible to achieve a heat transfer from the channel to the entire surface of the product pipe that is not directly heated. In addition to improving the heat transfer, the use of a thin coating that is applied over the surface of the product pipe simplifies a possible recycling of a pipe manufactured in that manner, since the insulation material and the product pipe remain almost completely separated. Metal foils and particularly aluminum foil represent particularly suitable materials. To prevent the thin coating from being pulled out when pulling the core out of the pipe section, a bonding agent can be applied to the thin coating surface facing the insulation material (the outside surface of the thin coating).

A further embodiment provides for the arranging of a spring-elastic element made of an elastic material such as foam on the core surface facing the insulation mass. When using an electric heat conductor to be introduced in the channel, this elastic element functions as a spring element and the heat conductor is pressed against the surface of the product pipe. The elastic element is compressed by the filling and hardening of the insulation mass. The elastic element will expand to achieve its original form after the core has been removed. When using the thin coating that promotes the heat transfer, the spring-elastic element can be arranged on and/or below the thin coating. When using hollow profiles that remain in the jacket pipe, the spring-elastic element can be arranged on the hollow profile's inside surface facing the channel.

The method in accordance with the invention can be developed further by fitting the product pipe and core with a spacer prior to inserting them in the jacket pipe, thus ensuring that they occupy a defined position within the jacket pipe.

Finally, a further embodiment proposes the use of an insulation mass that increases its volume during the hardening process, e.g., polyurethane foam. Polyurethane foam presents the advantage that it exhibits a low heat conductivity and a known compressive strength.

Figure 2:
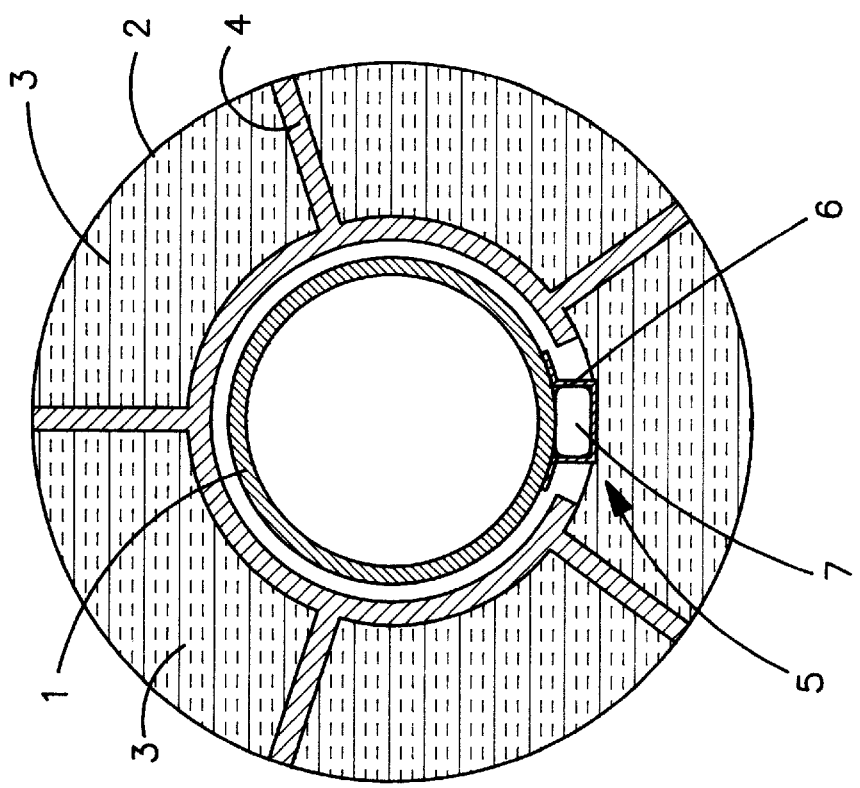
FIG. 2 is a cross-section of a preferred embodiment in a configuration with three U-shaped channels.

The pipe sections shown in FIGS. 1 and 2 in the form of a cross-section basically consist of product pipe 1 and insulation 3 enclosed by jacket pipe 2.

To maintain product pipe 1 in a predetermined position in jacket pipe 2, product pipe 1 is fitted with spacers 4 exhibiting radially arranged webs to ensure a uniform and preferably coaxial position of product pipe 1 within jacket pipe 2.

Channel 5 that is open toward product pipe 1 is provided on the jacket surface of product pipe 1 to receive, for example, an electrical heat conductor. In the embodiment shown in FIG. 1, rectangular channel 5 is arranged on the bottom of product pipe 1, while the embodiment shown in FIG. 2 shows three channels 5 arranged at a spacing on the bottom of product pipe 1.

To increase the heat transfer between the heat conductor and product pipe 1 and to achieve a separation between product pipe 1 and insulation mass 3 for a possible recycling at a later date, thin layer 6 consisting of a material that preferably promotes the heat transfer is applied to the jacket surface of product pipe 1 touching channel 5 and the outside surface of channels 5. Aluminum foil is a particularly suitable material for thin layer 6. In the embodiment shown in FIG. 2, thin layer 6 extends across the whole free jacket surface of product pipe 1.

The first process step in the manufacture of a pipe section exhibiting one or more channels 5 on the jacket surface of product pipe 1 is to dispose core 7 exhibiting the outside contour of channel 5 on the jacket surface of product pipe 1. To obtain the pipe cross-sections shown in FIGS. 1 and 2, thin layer 6 consisting of an aluminum foil is subsequently placed on the free jacket surface of product pipe 1 as well as on the outside surface of cores 7.

Spacers 4 are subsequently arranged on product pipe 1 and the unit formed by core 7 and product pipe 1 is inserted in jacket pipe 2.

In addition to using a thin-walled pipe as jacket pipe 2, jacket pipe 2 manufactured by way of a spiral-like coiling and folding of a stretched sheet metal band was proven to be very suitable.

After inserting the unit formed by core 7 and product pipe 1 in jacket pipe 2, the free cross-section of jacket pipe 2 is closed and the free channel cross-section of jacket pipe is subsequently filled with an insulation mass exhibiting a flowability in the processing condition to form insulation 3. Because polyurethane foam exhibits a low heat conductivity and hardens under pressure, it is considered a particularly suitable insulation mass.

To form channel 5 that is product pipe 1, core 7 is pulled out of the hardened insulation mass after the insulation mass has hardened. In addition to the simple and cost-effective manufacture of channel 5 that is open toward product pipe 1, this manufacturing method is characterized by the fact that an almost indefinite number of channel runs are possible along the pipe length and a good heat transfer to product pipe 1 is ensured due to the fact that channel 5 is in direct contact with pipe 1. In addition to being utilized as a heating channel, channel 5 can also be used to receive a detector cable or as a so-called "sniffing pipe" to discover leaks in product pipe 1. In the design form shown in FIG. 2 with three channels 5 arranged on the jacket surface of product pipe 1, each channel 5 can possibly be used for a different purpose.

Figure 3:
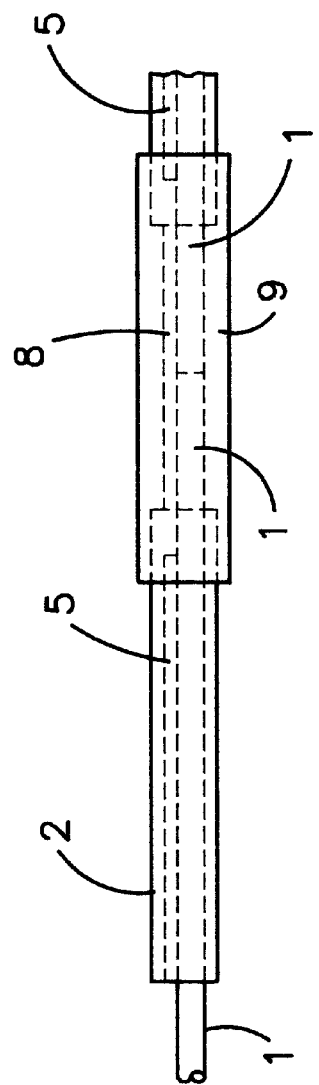
FIG. 3 is a plan view of a preferred embodiment of the invention consisting of two pipe sections.
Figure 3:
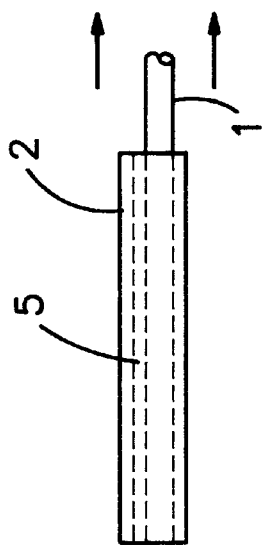

The connecting of pipe sections produced with this method occurs on site as shown in FIG. 3 in a schematic representation. First, a welded connection is achieved between product pipes 1 which project beyond jacket pipe 2, insulation 3, and channel 5. Next, a channel element 8 is inserted in channels 5 of the piping sections and connected so as to increase the length of channel 5 beyond the connection point. Product pipe 1 and channel 5 are subsequently insulated in a suitable manner and collar 9 is pushed onto the connection, thus connecting jacket pipes.

It may not be necessary to insert channel element 8 at the connection point when channels 5 of the pipe sections are used to receive a heat conductor and when an appropriate insulation is ensured at this connection point.

When channel 5 is used to receive an electric heat conductor, it is advantageous to make the cross-section of the channel several times larger than that of the heat conductor, since this provides the best utilization of the heat convection. Furthermore, this effect is reinforced by rounding the channel corners.

There are of course other alternate embodiments which are obvious from the foregoing descriptions of the invention, which are intended to be included within the scope of the invention, as defined by the following claims.

What is claimed is:

1. A method for the manufacture of individual pipe sections comprising a product pipe having a jacket surface and at least one channel running along said jacket surface of said product pipe comprising the following steps:
    a) arranging a core on said jacket surface of said product pipe such that said core is disposed on said product pipe in a linear manner;
    b) inserting said product pipe with said core into a jacket pipe;
    c) filling said jacket pipe with an insulating mass that exhibits a flowability only during processing; and
    d) removing said core from said jacket pipe.

2. The method of claim 1 wherein, prior to removing said core, said core mates with said jacket surface of said product pipe, defining said channel such that said channel will be in substantially direct contact with said product pipe after removal of said core.

3. The method of claim 1 wherein said core is an elastic material whose cross-section decreases when a tensile load is applied.

4. The method of claim 1 wherein said core is a material that is elastic and expands under pressure.

5. The method of claim 3 wherein said elastic material is silicone rubber.

6. The method of claim 1 wherein a separating agent is applied on the outside surface of said core facing the insulation prior to inserting said product pipe into said jacket pipe.

7. The method of claim 1 wherein an element comprising a spring-elastic material is disposed on the surface of said core facing the insulation.

8. A method for the manufacture of individual pipe sections comprising a product pipe having a jacket surface and at least one channel running along said jacket surface of said product pipe comprising the following steps:
    a) arranging a core on said jacket surface of said product pipe such that said core is disposed on said product pipe in a linear manner;
    b) inserting said product pipe with said core into a jacket pipe;
    c) filling said jacket pipe with an insulating mass that exhibits a flowability only during processing; and
    d) applying a thin coating to the outside surface of said core and the portion of the surface of said product pipe which touches said core.

9. The method of claim 8 wherein said thin coating is applied to the whole free jacket surface of the product pipe.

10. The method of claim 9 wherein said thin coating comprises a metal foil.

11. The method of claim 8 wherein said thin coating comprises aluminum foil.

12. The method of claim 10 wherein a bonding agent is applied to the outside surface facing the insulation of said metal foil.

13. The method of claim 8 wherein an element comprising a spring-elastic material is disposed on said thin coating.

14. A method for the manufacture of individual pipe sections comprising a product pipe having a jacket surface and at least one channel running along said jacket surface of said product pipe comprising the following steps:
    a) arranging a core, having a hollow profile open toward said product pipe, on said jacket surface of said product pipe such that said core is disposed on said product pipe in a linear manner;
    b) inserting said product pipe with said core into a jacket pipe; and
    c) filling said jacket pipe with an insulating mass that exhibits a flowability only during processing;

wherein an element comprising a spring-elastic material is disposed within said hollow profile of said core opposite said product pipe.

* * * * *